United States Patent
Horng et al.

(10) Patent No.: US 8,421,298 B2
(45) Date of Patent: Apr. 16, 2013

(54) MOTOR

(75) Inventors: Alex Horng, Kaohsiung (TW);
Hung-Jen Chuang, Kaohsiung (TW);
Sing-Ying Lee, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 255 days.

(21) Appl. No.: 12/959,518

(22) Filed: Dec. 3, 2010

(65) Prior Publication Data

US 2012/0100019 A1 Apr. 26, 2012

(30) Foreign Application Priority Data

Oct. 22, 2010 (TW) ............................... 99136027 A

(51) Int. Cl.
*H02K 1/04* (2006.01)
*F04B 35/04* (2006.01)

(52) U.S. Cl.
USPC .......... 310/215; 310/67 R; 310/71; 417/410.1

(58) Field of Classification Search ............... 310/67 R, 310/71; 360/98.07, 99.04, 99.08; 417/410.1
See application file for complete search history.

(56) References Cited

U.S. PATENT DOCUMENTS

| | | | | |
|---|---|---|---|---|
| 4,529,900 A | * | 7/1985 | Uzuka | 310/43 |
| 5,357,160 A | * | 10/1994 | Kaneda et al. | 310/67 R |
| 6,570,284 B1 | | 5/2003 | Agnes et al. | |
| 7,268,452 B2 | * | 9/2007 | Yoshino et al. | 310/71 |
| 7,812,489 B2 | * | 10/2010 | Hino et al. | 310/71 |

FOREIGN PATENT DOCUMENTS

| | | |
|---|---|---|
| TW | 201031087 A1 | 8/2010 |
| TW | 201032444 A1 | 9/2010 |

* cited by examiner

*Primary Examiner* — Tran Nguyen
(74) *Attorney, Agent, or Firm* — Alan Kamrath; Kamrath IP Lawfirm, P.A.

(57) ABSTRACT

A motor includes a casing, a rotor, a stator and a separation member. The rotor is rotatably coupled with the casing. The stator is disposed in the casing and drives the rotor to rotate. The stator includes a claw-pole member, an insulation member and a coil unit. The claw-pole member is coupled with the insulation member. The insulation member has a connection portion. The coil unit has a plurality of windings connected to each other via the connection portion. The coil unit is electrically connected to a circuit board, and a portion of the coil unit that is wound around the connection portion is an exposing portion. The separation member is disposed between the exposing portion of the coil unit and the casing.

24 Claims, 9 Drawing Sheets

MOTOR

BACKGROUND OF THE INVENTION

1. Field of the Invention

The present invention generally relates to a motor and, more particularly, to a motor that separates its coil unit from a metallic casing thereof for insulation purposes.

2. Description of the Related Art

Referring to FIG. 1, Taiwanese Patent Publication Number 201032444 discloses an inner-rotor-type motor 7 including a casing 71, a stator 72 and a rotor 73. The casing 71 is hollow and is used to receive the stator 72. The stator 72 consists of a plurality of silicon steel plates 721 and a coil 722. The rotor 73 is rotatably coupled with the casing 71. Based on this arrangement, the rotor 73 can be coupled with an impeller 74 so that the impeller 74 may provide a cooling effect when the stator 72 drives the rotor 73 to rotate.

The casing 71 of the inner-rotor-type motor 7 is usually made of metal material. Since there is no insulation between the coil 722 of the stator 72 and the casing 71, the coil 722 could be short-circuited with the casing 71 once the enamel coated on the coil 722 comes off. Thus, operation of the inner-rotor-type motor 7 is impacted.

In light of the problem, referring to FIG. 2, Taiwanese Patent Publication Number 201031087 discloses an inner-rotor-type motor 8. The inner-rotor-type motor 8 includes a casing 81, a stator 82 and a rotor 83. The casing 81 is hollow and is used to receive the stator 82. The stator 82 consists of a plurality of silicon steel plates 821, an upper insulation bobbin 822, a lower insulation bobbin 823 and a coil 824. The rotor 83 is rotatably coupled with the casing 81.

In the above inner-rotor-type motor 8, the silicon steel plates 821 are stacked with each other to form a silicon steel plate unit. Then, the upper insulation bobbin 822 and the lower insulation bobbin 823 are coupled with two ends of the silicon steel plate unit, respectively. Finally, an enameled wire is wound around predetermined portions of the silicon steel plate unit, upper insulation bobbin 822 and lower insulation bobbin 823 to form the coil 824. Based on this, once the enamel coated on the coil 824 comes off during the winding process, the upper insulation bobbin 822 and lower insulation bobbin 823 may provide an insulation effect therefor.

However, referring to FIG. 3, a conventional stator 9 is shown. The conventional stator 9 includes at least one insulation bobbin 91 which generally has a plurality of connection portions 92. During the winding process of windings 93, the connection portions 92 may connect all windings 93 together. When the conventional stator 9 is received in a metallic casing of a motor and although the insulation bobbin 91 is able to keep certain portions of the windings 93 away from the metallic casing, insulation for the portions of the windings 93 that are wound around the connection portions 92 is not provided. Furthermore, the windings 93 of the conventional stator are generally connected to a circuit board. In this case, improper contact between the metallic casing and the portions of the windings 93 that are connected to the circuit board, or between the casing and wires of the circuit board, can easily occur. Therefore, when the conventional stator 9 having the at least one insulation bobbin 91 is received in a metallic casing of a motor, improper contact between the metallic casing and the windings 93, or between the metallic casing and the wires of the circuit board, is possible, causing short circuit of the windings 93 or the wires of the circuit board. As a result, operation of the motor is impacted.

SUMMARY OF THE INVENTION

It is therefore the primary objective of this invention to provide a motor that keeps a coil unit of a stator thereof away from a casing thereof to avoid the short circuit of the coil unit.

It is another objective of this invention to provide a motor that keeps a portion of a coil unit of a stator, that extends to a circuit board, away from a casing thereof.

It is yet another objective of this invention to provide a motor that keeps a wire of a circuit board away from a casing thereof.

The invention discloses a motor including a casing, a rotor, a stator and a separation member. The rotor is rotatably coupled with the casing. The stator is disposed in the casing and drives the rotor to rotate. The stator includes a claw-pole member, an insulation member and a coil unit. The claw-pole member is coupled with the insulation member. The insulation member has a connection portion. The coil unit has a plurality of windings connected to each other via the connection portion. The coil unit is electrically connected to a circuit board, and a portion of the coil unit that is wound around the connection portion is an exposing portion. The separation member is disposed between the exposing portion of the coil unit and the casing.

Furthermore, the invention discloses a motor including a casing, a rotor, a stator and a separation member. The rotor is rotatably coupled with the casing. The stator is disposed in the casing and drives the rotor to rotate. The stator includes a claw-pole member, an insulation member and a coil unit wound around the insulation member. The claw-pole member is coupled with the insulation member and the coil unit is electrically connected to a circuit board. The separation member is disposed between the casing and a portion of the coil unit that extends to the circuit board.

Furthermore, the invention discloses a motor including a casing, a rotor, a stator and a separation member. The rotor is rotatably coupled with the casing. The stator is disposed in the casing and drives the rotor to rotate. The stator includes a claw-pole member, an insulation member and a coil unit. The claw-pole member is coupled with the insulation member. The coil unit is wound around the insulation member and electrically connected to a circuit board. The circuit board has a wire. The separation member is disposed between the casing and the wire.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
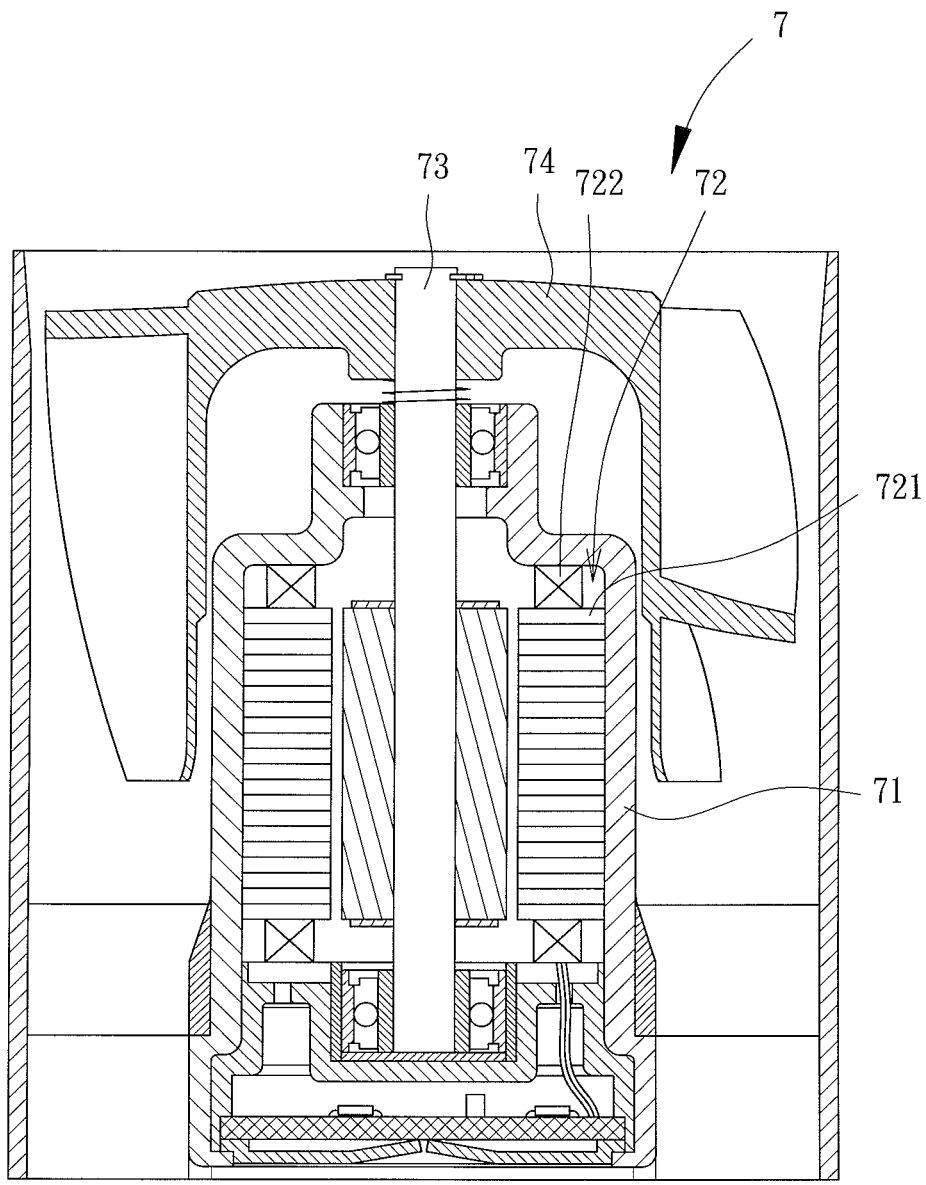
FIG. 1 shows a side cross sectional view of a conventional motor.
Figure 2:
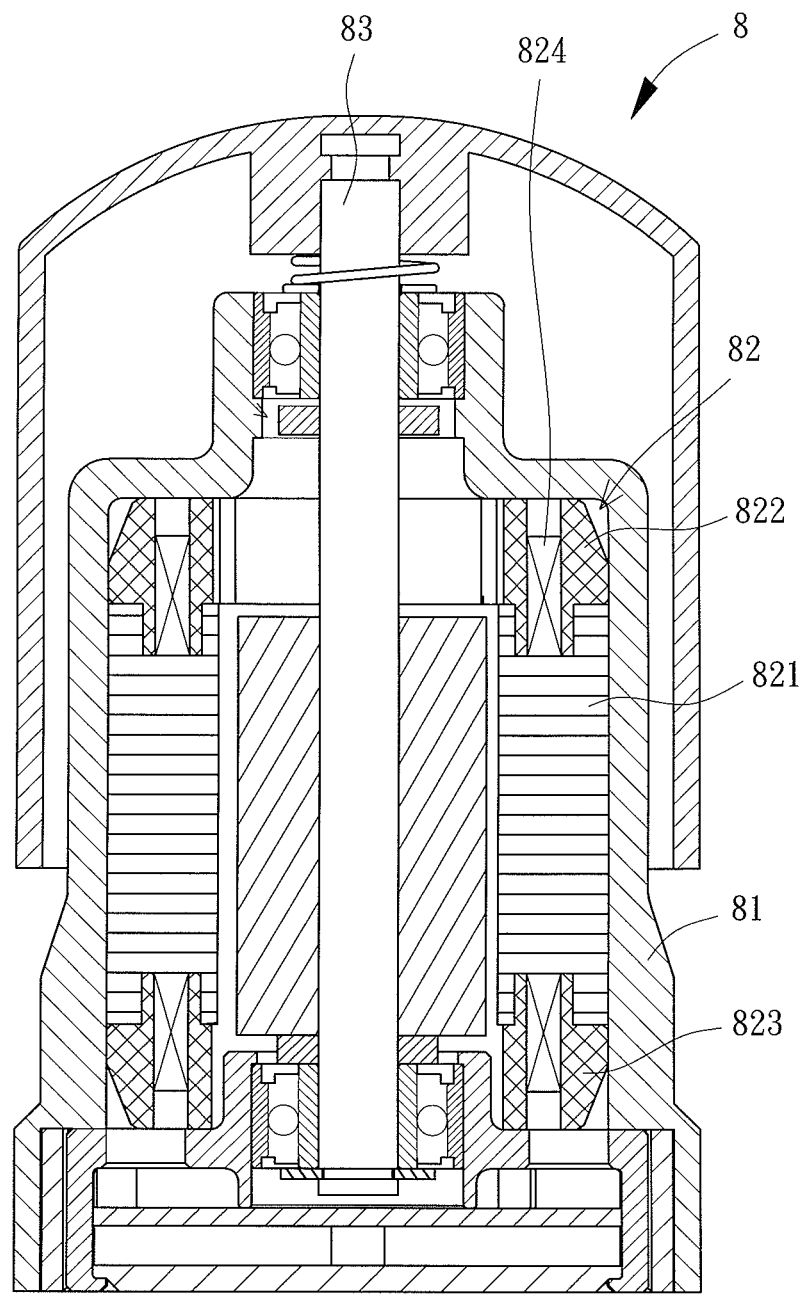
FIG. 2 shows a side cross sectional view of another conventional motor.
Figure 3:
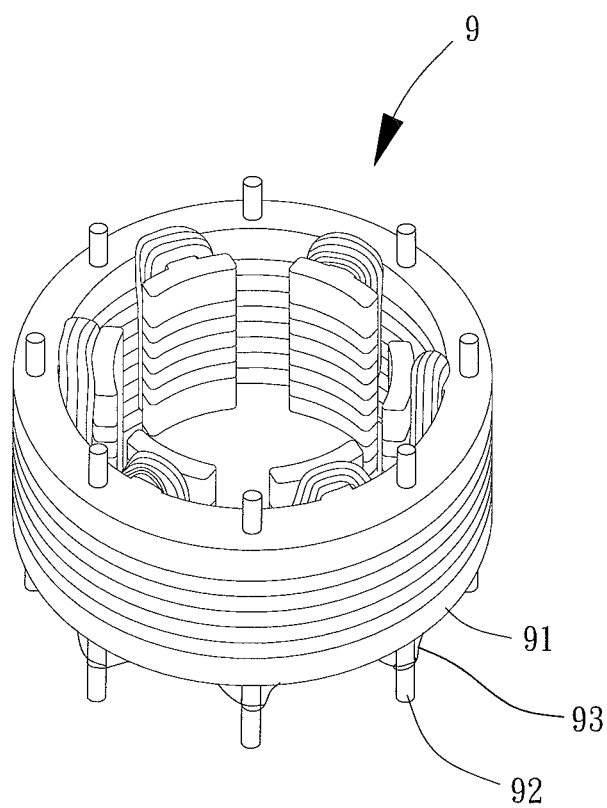
FIG. 3 shows a diagram of a conventional stator.

In the various figures of the drawings, the same numerals designate the same or similar parts. Furthermore, when the terms "first", "second", "third", "fourth", "inner", "outer," "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 4:
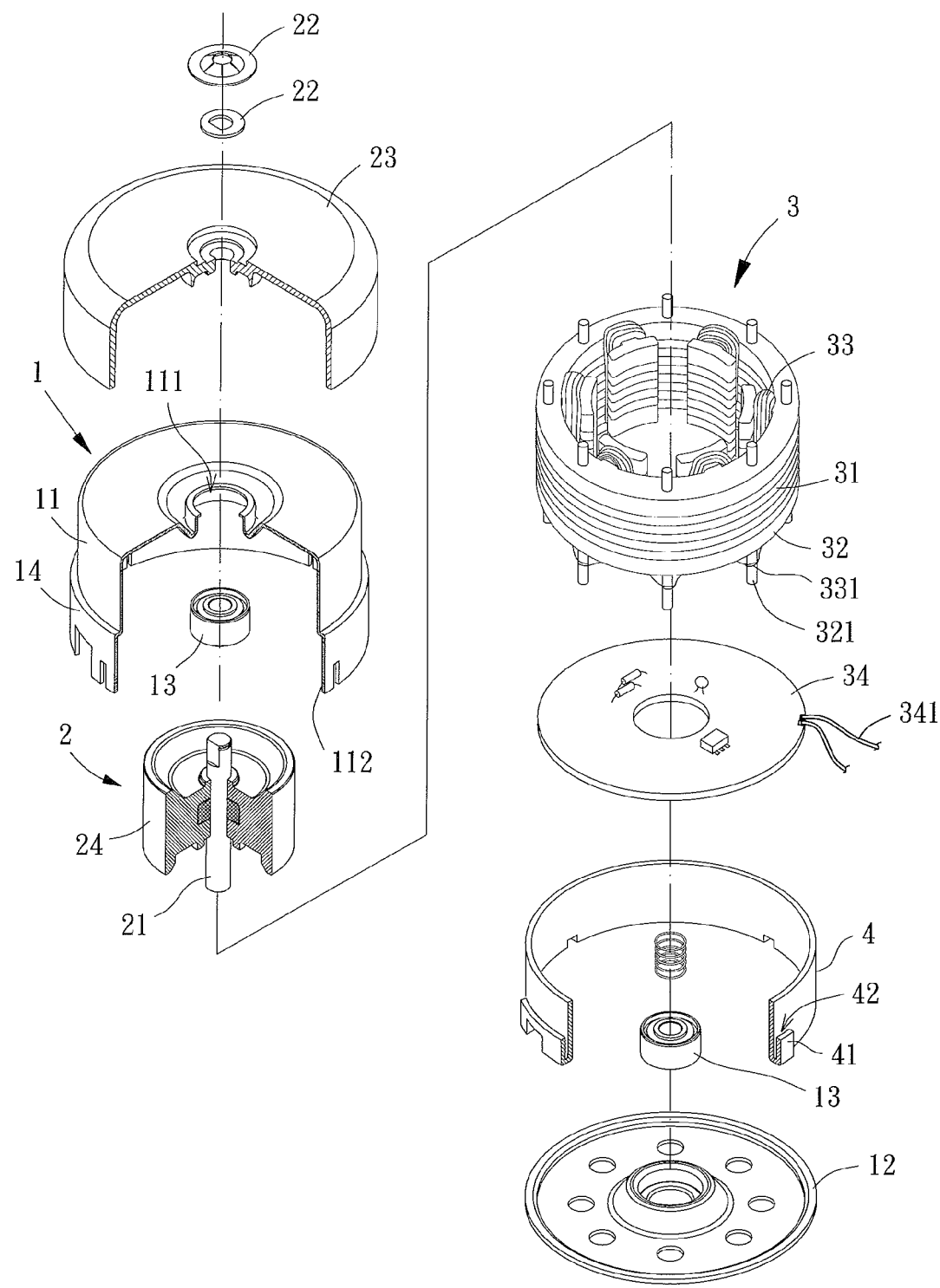
FIG. 4 shows an exploded view of a motor according to a first embodiment of the invention.
Figure 5:
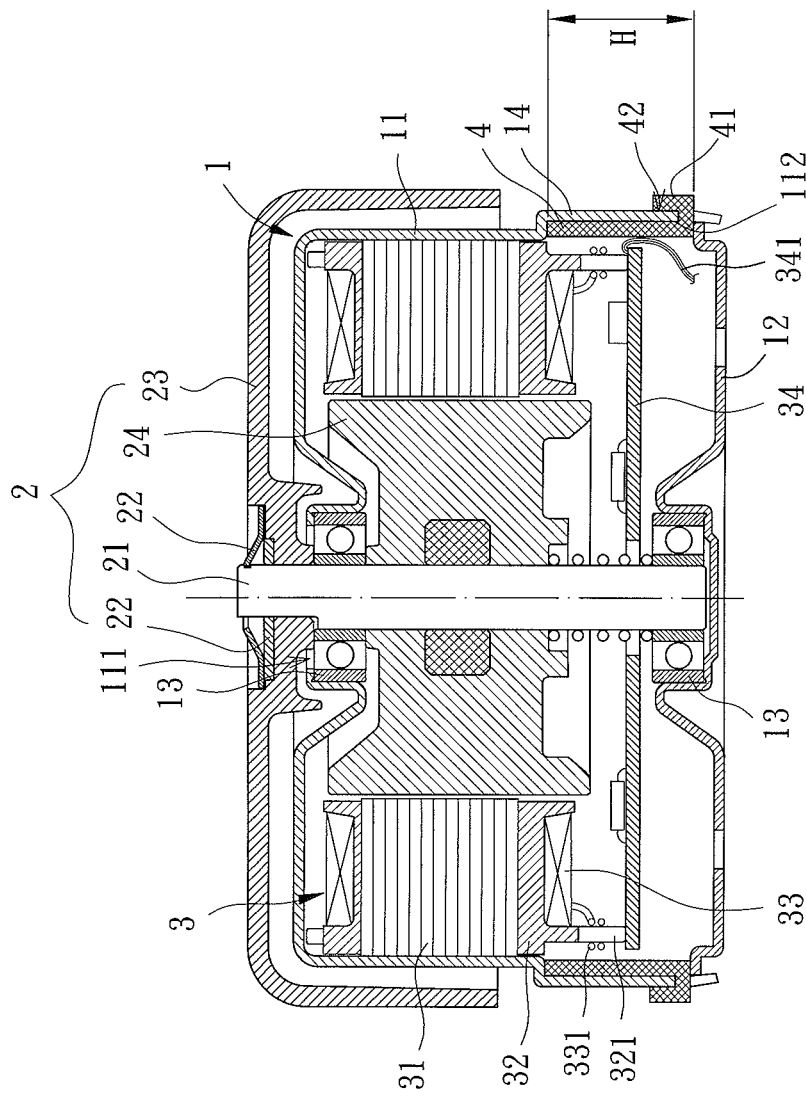
FIG. 5 shows a side cross sectional view of a motor according to the first embodiment of the invention.

Referring to FIGS. 4 and 5, a motor including a casing 1, a rotor 2, a stator 3 and a separation member 4 is disclosed according to a first embodiment of the invention. The casing 1 is hollow, and the rotor 2 is rotatably coupled with the casing 1. The stator 3 is received in the casing 1 and is used to drive the rotor 2 to rotate. The separation member 4 is disposed between the casing 1 and the stator 3 for insulation purposes.

The casing 1 receives the stator 3 and is coupled with the rotor 2. Thus, the casing 1 can be of any structure capable of achieving the above purposes. In this embodiment, the casing 1 includes a casing body 11 and an enclosing member 12. The casing body 11 includes a through hole 111 and an opening 112 on two ends thereof, and the enclosing member 12 is disposed at the opening 112. Furthermore, the casing body 11 may include a plurality of bearings 13 disposed therein (or only one bearing 13), with one of the bearings 13 being coupled on one side of the through hole 111, and another one of the bearings 13 being coupled on one side of the enclosing member 12 that faces the casing body 11.

The rotor 2 includes a shaft 21 which can be coupled with the bearing 13 through the through hole 111. Thus, the rotor 2 is allowed to rotatably couple with the casing 1. The rotor 2 includes one end which can extend outside the casing 1 so that the end of the rotor 2 can couple with a hub 23 via a pad unit 22. The shaft 21 of the rotor 2 is further coupled with a permanent magnet 24 that is disposed in the casing 1.

The stator 3 includes a claw-pole member 31, an insulation member 32 and a coil unit 33. The claw-pole member 31 may be integrally formed or may be in the form of a plurality of silicon steel plates stacked with each other. The insulation member 32 is coupled with the claw-pole member 31 and includes a connection portion 321. The insulation member 32 can be of any structure capable of providing insulation for the claw-pole member 31. For example, the insulation member 32 can be a single insulation bobbin or a plurality of insulation bobbins to be wound by the coil unit 33. Alternatively, the insulation member 32 may also be in the form of an insulation layer with which the claw-pole member 31 is coated, so that the coil unit 33 may be wound around the surface of the insulation layer. Moreover, the connection portion 321 can be of any structure designed to be connected by the coil unit 33. For instance, when the insulation member 32 is in the form of an insulation bobbin, the connection portion 321 may be implemented in the form of a shank that facilitates the winding operation of the coil unit 33. In addition, when the insulation member 32 is in the form of an insulation layer, the connection portion 321 may be omitted. In this case, the coil unit 33 is electrically connected to a circuit board 34.

As shown in FIG. 4, the insulation member 32 consists of an upper insulation bobbin and a lower insulation bobbin, and the connection portion 321 is in the form of a plurality of shanks formed on the lower insulation bobbin. The coil unit 33 is partially wound around predetermined portions of the insulation member 32 and is electrically connected to the circuit board 34 (the circuit board 34 may be disposed outside the casing 1, and the coil unit 33 is externally connected to the circuit board 34). The circuit board 34 may include a wire 341 to be externally connected to a power supply. During the winding process of the coil unit 33, the connection portion 321 of the insulation member 32 may be used to fix the remaining wire of the coil unit 33. Here, the portion of the coil unit 33 wound around the connection portion 321 of the insulation member 32 is defined as an exposing portion 331.

In contrast to the various types of stator 3 described previously, when the insulation member 32 is in the form of the insulation bobbin, the separation member 4 may be disposed between the exposing portion 331 of the coil unit 33 and the casing 1. In addition, when the insulation member 32 is in the form of the insulation bobbin or insulation layer, the separation member 4 may be disposed between the casing 1 and the portion of the coil unit 33 that extends to the circuit board 34. In this way, the exposing portion 331 of the coil unit 33, or the portion of the coil unit 33 that extends to the circuit board 34, may be kept away from the casing 1. Furthermore, the separation member 4 may also be disposed between the wire 341 and the casing 1 to keep them away from each other.

In the embodiment, the separation member 4 is an annular insulation sleeve to be partially disposed on an inner circumferential face of the casing 1. Based on this, improved insulation of the coil unit 33 or the wire 341 is provided. In addition, the separation member 4 may further include a plurality of positioning panels 41, with an engaging groove 42 being formed between the positioning panels 41 and an outer circumferential wall of the separation member 4. Based on this, the portion of the casing 1 that is close to the opening 112 may be engaged into the engaging groove 42 when the separation member 4 is coupled with the casing 1. In this case, the positioning panels 41 may be fixed to the casing 1. Referring to FIG. 5, the separation member 4 has an axial height H in an axial direction of the shaft 21 of the rotor 2. In this way, the exposing portion 331, the portion of the coil unit 33 that extends to the circuit board 34, or the wire 341, may be covered within the axial height H, thereby providing an improved insulation effect.

Furthermore, the casing 1 may preferably form an enlarge portion 14 aligned with the exposing portion 331 of the coil unit 33. Alternatively, the enlarge portion 14 may be aligned with the portion of the coil unit 33 that extends to the circuit board 34. Alternatively, the enlarge portion 14 may be aligned with the wire 341. The separation member 4 may be partially disposed on an inner circumferential wall of the enlarge portion 14 to keep the coil unit 33 or the wire 341 away from the casing 1. Thus, a better insulation effect is provided.

Figure 6:
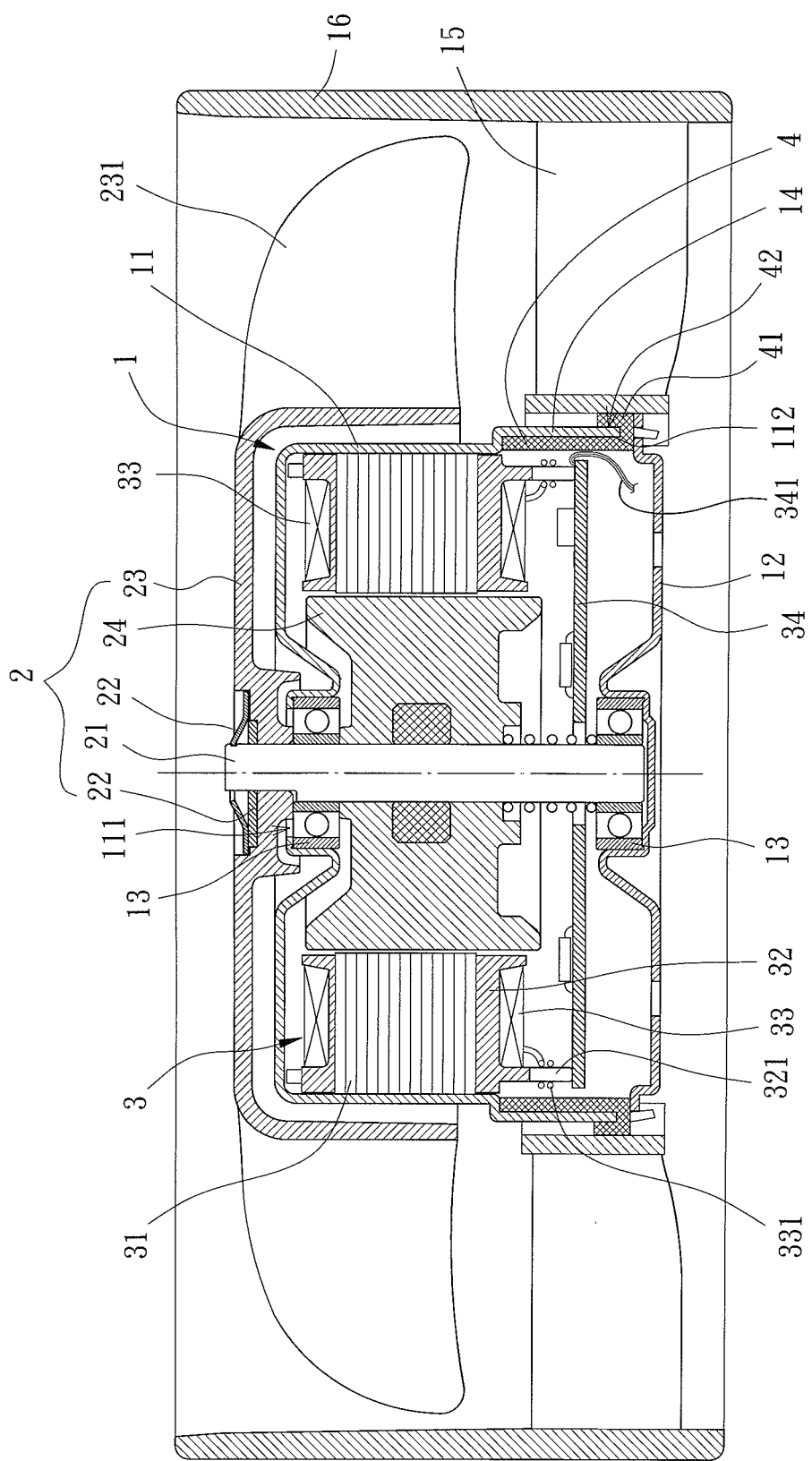
FIG. 6 shows a use of the motor of the first embodiment applied to a cooling fan.

During usage of the motor, alternating magnetic fields generated by the stator 3 may drive the rotor 2 to rotate. As shown in FIG. 6, the casing 1 may be further connected to a frame 16 via a plurality of connection members 15 (such as ribs or stationary blades), and the hub 23 of the rotor 2 may include a plurality of vanes 231 on an outer circumferential surface thereof. Thus, a cooling fan is formed. The cooling fan may be installed in various electronic devices or instruments for cooling purposes.

The motor of the invention is characterized in that, by disposing the separation member 4 between the coil unit 33 and the casing 1, the exposing portion 331, the portion of the coil unit 33 that extends to the circuit board 34, or the wire 341, may be kept away from the casing 1 to prevent the short circuit therebetween.

Figure 7:
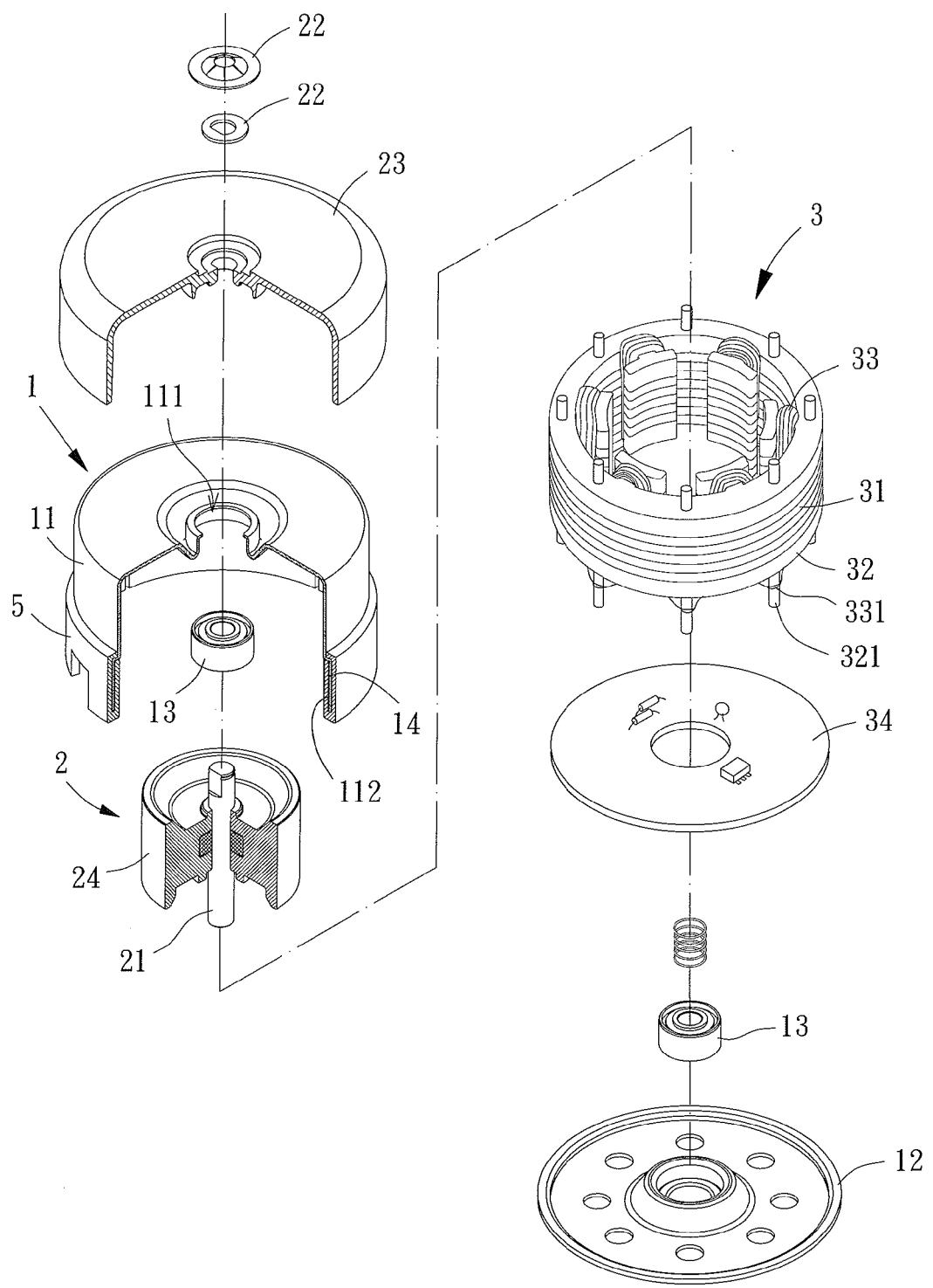
FIG. 7 shows an exploded view of a motor according to a second embodiment of the invention.
Figure 8:
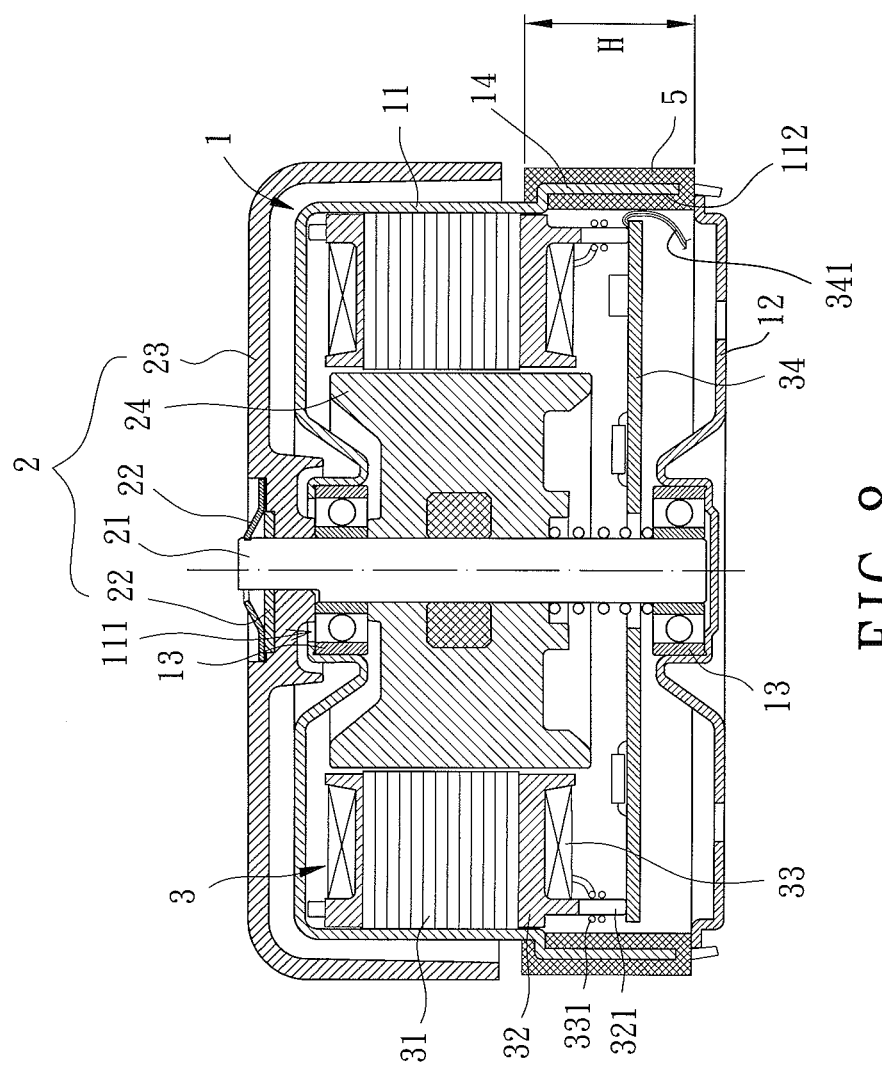
FIG. 8 shows a side cross sectional view of a motor according to the second embodiment of the invention.

Referring to FIGS. 7 and 8, a motor including a casing 1, a rotor 2, a stator 3 and a separation member 5 is disclosed according to a second embodiment of the invention. The casing 1, rotor 2 and stator 3 in this embodiment are similar to those in the first embodiment, so they are not described herein again for brevity.

The motor in the second embodiment differs from the first embodiment in that the separation member 5 can also be located between the exposing portion 331 of the coil unit 33 and the casing 1, and can encase a portion of the casing 1 in an integral manner. Based on this, the assembly procedure of the motor is simplified. In the embodiment, the separation member 5 completely encases the enlarge portion 14 of the casing 1 for insulation purposes.

Figure 9:
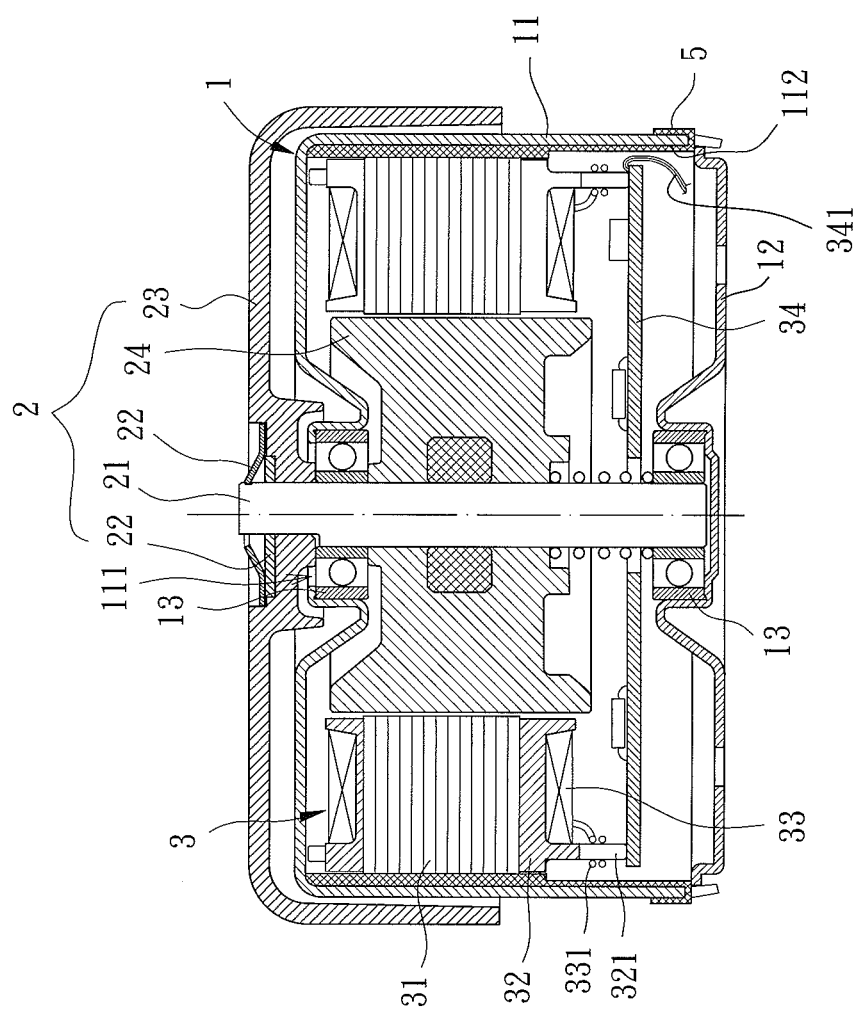
FIG. 9 shows a side cross sectional view of the motor of the second embodiment according to another implementation of the motor.

In addition, as shown in FIG. 9, the casing 1 omits the enlarge portion 14, and the separation member 5 directly encases inner and outer circumferential faces of the casing 1. In particular, the separation member 5 totally encases the inner circumferential face of the casing 1. Thus, coupling between the separation member 5 and the casing 1 is ensured.

As stated above, the coil unit 33 or wire 341 of the stator 3 is efficiently kept away from the casing 1 via the separation members 4 and 5 between the exposing portion 331 of the coil unit 33 and the casing 1. Thus, short circuit of the coil unit 33 or wire 341 is avoided for insulation purposes.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor comprising:
a casing;
a rotor rotatably coupled with the casing;
a stator disposed in the casing and driving the rotor to rotate, wherein the stator comprises a claw-pole member, an insulation member and a coil unit, the claw-pole member is coupled with the insulation member, the insulation member has a connection portion, the coil unit has a plurality of windings connected to each other via the connection portion, the coil unit is electrically connected to a circuit board, and a portion of the coil unit that is wound around the connection portion is an exposing portion; and
a separation member disposed between the exposing portion of the coil unit and the casing, wherein the casing forms an enlarge portion aligned with the exposing portion of the coil unit.

2. The motor as claimed in claim 1, wherein the separation member is partially disposed on an inner circumferential face of the casing. enlarge portion aligned with the exposing portion of the coil unit.

3. The motor as claimed in claim 1, wherein the separation member has an axial height in an axial direction of the rotor, and the exposing portion is covered within the axial height.

4. The motor as claimed in claim 1, wherein the separation member is an annular insulation sleeve.

5. The motor as claimed in claim 4, wherein the separation member includes a plurality of positioning panels, an engaging groove is formed between the positioning panels and an outer circumferential wall of the separation member, and the casing is partially engaged into the engaging groove.

6. The motor as claimed in claim 1, wherein the separation member encases a portion of the casing in an integral manner.

7. The motor as claimed in claim 6, wherein the separation member encases the enlarge portion of the casing in an integral manner.

8. The motor as claimed in claim 1, wherein the casing is connected to a frame via a plurality of connection members, and the rotor is coupled with an impeller which includes a plurality of vanes on an outer circumferential surface thereof, to form a cooling fan.

9. A motor comprising:
a casing;
a rotor rotatably coupled with the casing;
a stator disposed in the casing and driving the rotor to rotate, wherein the stator comprises a claw-pole member, an insulation member and a coil unit wound around the insulation member, the claw-pole member is coupled with the insulation member, and the coil unit is electrically connected to a circuit board; and
a separation member disposed between the casing and a portion of the coil unit that extends to the circuit board, wherein the casing forms an enlarge portion aligned with the portion of the coil unit that extends to the circuit board.

10. The motor as claimed in claim 9, wherein the separation member is partially disposed on an inner circumferential face of the casing.

11. The motor as claimed in claim 9, wherein the separation member has an axial height in an axial direction of the rotor, and the portion of the coil unit that extends to the circuit board is covered within the axial height.

12. The motor as claimed in claim 9, wherein the separation member is an annular insulation sleeve.

13. The motor as claimed in claim 12, wherein the separation member includes a plurality of positioning panels, an engaging groove is formed between the positioning panels and an outer circumferential wall of the separation member, and the casing is partially engaged into the engaging groove.

14. The motor as claimed in claim 9, wherein the separation member encases a portion of the casing in an integral manner.

15. The motor as claimed in claim 14, wherein the separation member encases the enlarge portion of the casing in the integral manner.

16. The motor as claimed in claim 9, wherein the casing is connected to a frame via a plurality of connection members, and the rotor is coupled with an impeller which includes a plurality of vanes on an outer circumferential surface thereof, to form a cooling fan.

17. A motor comprising:
a casing;
a rotor rotatably coupled with the casing;
a stator disposed in the casing and driving the rotor to rotate, wherein the stator comprises a claw-pole member, an insulation member and a coil unit, the claw-pole member is coupled with the insulation member, the coil unit is wound around the insulation member and electrically connected to a circuit board, and the circuit board has a wire; and
a separation member disposed between the casing and the wire, wherein the casing forms an enlarge portion aligned with the wire.

18. The motor as claimed in claim 17, wherein the separation member is partially disposed on an inner circumferential face of the casing.

19. The motor as claimed in claim 17, wherein the separation member has an axial height in an axial direction of the rotor, and the wire is covered within the axial height.

20. The motor as claimed in claim 17, wherein the separation member is an annular insulation sleeve.

21. The motor as claimed in claim 20, wherein the separation member includes a plurality of positioning panels, an engaging groove is formed between the positioning panels and an outer circumferential wall of the separation member, and the casing is partially engaged into the engaging groove.

22. The motor as claimed in claim 17, wherein the separation member encases a portion of the casing in an integral manner.

23. The motor as claimed in claim 22, wherein the separation member encases the enlarge portion of the casing in the integral manner.

24. The motor as claimed in claim 17, wherein the casing is connected to a frame via a plurality of connection members, and the rotor is coupled with an impeller which includes a plurality of vanes on an outer circumferential surface thereof, to form a cooling fan.

* * * * *